J. J. CRAIN.
SHAFT REVOLUTION INDICATOR SYSTEM.
APPLICATION FILED MAR. 7, 1912.
1,068,111. Patented July 22, 1913.
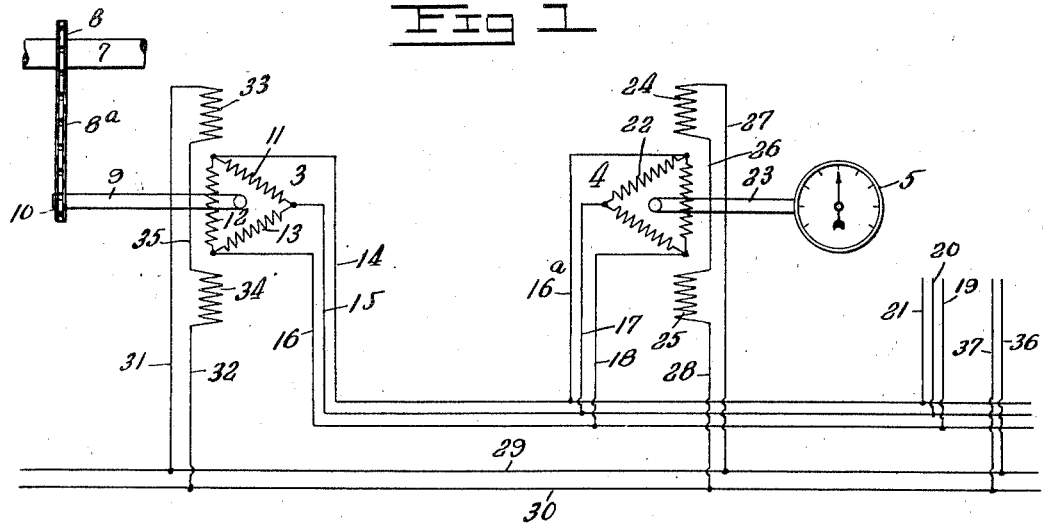
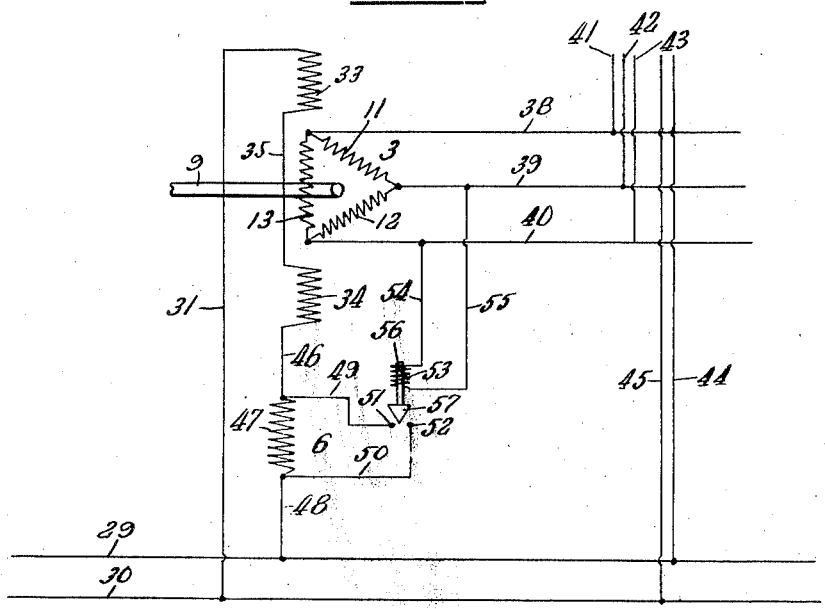
Witnesses
H. C. Robinette
Walton Harrison
Inventor
John J. Crain
By Meyers, Cushman & Rea
Attorney

UNITED STATES PATENT OFFICE.

JOHN J. CRAIN, OF QUINCY, MASSACHUSETTS.

SHAFT-REVOLUTION-INDICATOR SYSTEM.

1,068,111.      Specification of Letters Patent.      Patented July 22, 1913.

Application filed March 7, 1912. Serial No. 682,168.

*To all whom it may concern:*

Be it known that I, JOHN J. CRAIN, a citizen of the United States, residing at Quincy, in the county of Norfolk and State of Massachusetts, have invented new and useful Improvements in Shaft-Revolution-Indicator Systems, of which the following is a specification.

My invention relates to shaft revolution indicator systems, and admits of general use in many arts, but is of peculiar value for service in connection with ships and other craft driven by power.

More particularly stated my invention comprehends a revoluble shaft, such, for instance as a propeller shaft, a polyphase generator controllable by movements of said revoluble shaft, a polyphase motor in synchronism with said electric generator and located at a distance therefrom and driven by currents generated thereby, and devices connected with and actuated by said motors for indicating both the speed and direction of the revoluble shaft.

My invention further relates to electrical operating mechanism, controllable by voltage of the currents generated by a polyphase generator, for automatically varying the strength of the field of the generator, so that when the voltage controlling the motor drops below a predetermined limit the strength of the field of the generator is automatically increased, and the voltage of the current controlling the motor is thus raised.

My invention also comprehends the use of a generator, and one or more motors of such type that the indications controllable by aid of the motor or motors take place gradually rather than step by step, so that the system is especially applicable for use in connection with a driving shaft which rotates continuously, the precise speed as well as the direction of the rotation being rendered apparent at all times My invention further comprehends various improvements whereby the general efficiency of indicating systems of the type to which this invention relates is greatly increased.

While for the sake of simplicity I show my system as used in connection with a tri-phase generator and a tri-phase motor, it will be understood that any other polyphase generator and motor may be used instead. It will also be understood that any desired number of motors may be employed, each motor being preferably used in connection with its own speedometer or other indicating instrument.

Reference is made to the accompanying drawing forming a part of this specification, and in which like letters indicate like parts.

Figure 1 is a diagram showing my invention as applied to the propeller shaft of a ship for the purpose indicating, at a distance from the shaft, the direction and speed of the latter. Fig. 2 is a diagram showing my system substantially as indicated in Fig. 1, but with the addition of electrically operated mechanism for automatically diminishing the resistance of the field circuit, thereby raising the field current of the generator whenever the voltage of the armature circuit drops below a predetermined limit.

A tri-phase generator is shown at 3, a tri-phase motor at 4, and a speedometer (or other suitable form of tachometer) at 5.

At 6 (see Fig. 2) is my device controllable automatically by the voltage of currents generated by the tri-phase generator, for cutting out a part of the resistance of the generator field circuit, and thus increasing the voltage of the generator.

A revoluble shaft is shown at 7 and may be a propeller shaft of a vessel used in navigation. Mounted rigidly upon this shaft is a sprocket wheel 8 which is connected by a sprocket chain $8^a$ with a sprocket pinion 10, the latter being mounted upon a shaft 9. This shaft is the armature shaft of the generator 3. Armature windings of the generator 3 are shown at 11, 12, 13, and constitute, in this instance, the wiring of a delta armature. Connected with the windings are wires 14, 15, 16, and connected with these wires are other wires $16^a$, 17, 18, which lead to a delta winding 22 which constitutes the armature winding of the motor 4. The field windings of this motor are shown at 24, 25, and are connected by a wire 26. The field windings 24, 25, are respectively connected by wires 27, 28 with two mains 29, 30, which supply a direct current from any convenient source. Connected with the mains 29, 30 are two other wires 31, 32, which lead to two field windings 33, 34 with which the generator 3 is provided. These two field windings are connected together by a wire 35. Any number of motors corresponding to the motor 4 may be employed. At the right of Fig. 1, I show three wires 19, 20, 21, corresponding to the three wires 18, 17, 16ª, and which lead to such a motor (not shown), the field windings of the latter being connected by wires 36, 37, with the mains 29, 30. The various motors thus have their respective armatures in parallel with the wires 14, 15, 16 leading to the generator, the various fields of the respective motors being in parallel with each other with reference to the mains 29, 30.

In my system as shown in Fig. 2, the arrangement is practically the same as in Fig. 1, but some parts are added. The armature windings 11, 12, 13 of the generator 3 are connected together so as to form a delta armature and are also connected to three wires 38, 39, 40. Connected with these wires respectively are other wires 41, 42, 43, which lead to the armature of a motor of the type shown at 4 in Fig. 1. The field windings of the motor in question are connected to wires 44, 45, the latter leading to the mains 29, 30. A wire 46 is connected to the field winding 34 of the generator 3, and is also connected to a resistance winding 47. Connected with the latter is a wire 48 which leads to the main 29. The field winding 33 is connected with the main 30 by a wire 31 as shown at the left of Fig. 1. Connected with the respective ends of the resistance winding 47 are two wires 49, 50, and these wires lead to stationary contact members 51, 52. Disposed adjacent to these contact members is a voltage solenoid 53. Connected with the latter are two wires 54, 55, which lead respectively to the wires 40, 39. The solenoid 53 is provided with a movable core 56 which carries a contact member 57, the latter being movable with the core and adapted to make and break communication between the contact members 51, 52, in such manner as to short circuit the resistance winding 47 when the core 56 is in its lowermost position.

The operation of the system will be readily understood from the foregoing description. The propeller shaft 7 rotates continuously, and as a result the armature shaft 9 causes the armature of the generator 3 to rotate continuously. Currents are generated in the windings 11, 12, 13, by virtue of the proximity of these windings to the field as they rotate, in the manner well understood in this art. These currents are alternating in character, and energize the wires 14, 15, 16, in triple-phase. The armature of the motor 4 is correspondingly energized, so that the armature of this motor turns synchronously with the armature of the generator 3. Current is supplied to all of the field windings, which as above explained are stationary, and are connected in parallel with reference to the direct current mains 29, 30.

As the armature of the motor turns it causes the rotation of the shaft 23, and as this shaft is connected with the speedometer 5 or other appropriate indicating instrument, the latter is thereby actuated and indicates the revolutions per minute. Not only that, but the indicating instrument also discloses the direction of travel of the armature of the motor 4 and in so doing discloses the direction in which the armature of the generator 3 and the propeller shaft 7 are turning. It may sometimes happen, however, and especially when the vessel is running very slowly, that the voltage of the currents generated by the generator 3 may drop so low as to introduce an element of uncertainty in the positiveness of movement of the armature of the motor 4. To provide against this, I supply the resistance winding 47, and place the same in series with the field windings of the generator 3 as indicated in Fig. 2. I also supply the solenoid 53, and various other parts immediately associated therewith, as above described. If now the voltage of the currents produced by the generator 3 drops so low that the currents will not with certainty cause the armature of each motor to rotate, the attraction of the solenoid for its core 56 becomes correspondingly weakened, and the core drops into its lowermost position, so as to bridge the space between the contact members 51 and 52. This cuts out the resistance winding 47 and in so doing increases the intensity of the magnetic field set up by the field windings 33, 34, and as the generator 3 continues to operate, by virtue of the rotation of the propeller shaft, the energy of the currents generated is correspondingly increased. The motor armatures are therefore caused to turn, and in so doing to move synchronously with the armature of the generator.

I will now trace the circuits affected by the operations above described. The field circuit of the generator is as follows, according to Fig. 1: main 29, wire 31, field winding 33, wire 35, field winding 34, wire 32 to source of supply, thence back to wire 29. The circuit energizing the field windings of one of the motors is as follows: main 29, wire 27, field winding 24, wire 26, field winding 25, wire 28, main 30, source of supply, back to main 29. The circuit just traced applies to the single motor 4 shown. For another motor (not shown) the circuit through the field winding is as follows: main 29, wire 36, field windings (not shown) wire 37, main 30, source of supply, back to main 29. An armature circuit may be traced as follows: delta armature of generator 3, wire 14, wire 16ª, delta armature of motor, 4, wires 17, 18, wires 15, 16, back to delta armature of generator 3. It will be understood that the wires 14, 15, 16 and other wires connected to them, are energized in successive phase, and that at any moment the current flowing through one of these wires is equal to the current or currents flowing in the opposite direction through the other two wires, as is usual in tri-phase systems. Where my system is used as in Fig. 2, the field circuit may be traced as follows: main 29, wire 48, resistance winding 47, wire 46, field winding 34, wire 35, field winding 33, wire 31, wire 30, source of supply, back to main 29. A circuit for energizing the field magnets of a motor, where the system is used as indicated in Fig. 2, may be traced as follows: main 29, wire 44, field windings of motor (not shown), wire 45, main 30, source of supply, back to main 29. An armature circuit where my system is used as indicated in Fig. 2, may be traced as follows: delta armature of generator 3, wire 38, wire 41, delta armature of motor (not shown), wires 42, 43, wires 39, 40, back to delta armature of generator 3. As the wires 39, 40, are in different phase however, and are connected through wires 54, 55 with solenoid 53, a circuit may be traced through the solenoid 53 as follows: delta armature of generator 3, part of wire 39, wire 55, solenoid 53, wire 54, part of wire 40, back to delta armature of generator 3. This circuit keeps the solenoid 53 normally energized. Suppose, however, that the voltage of the currents generated by the generator 3 drops below the predetermined limit; the result is that the solenoid 53 becomes deënergized, and the core 56 drops down upon the contact members 51, 52. The field circuit is thus modified and may be traced as follows: main 29, wire 48, wire 50, contact members 52, 57, 51, wires 49, 46, field winding 34, wire 35, field winding 33, wire 31, main 30, source of supply, back to main 29. This being a circuit of comparatively low resistance, the circuit passing through the field windings 33, 34 is greatly increased, and because of this fact, the voltage of the currents generated in the delta armature of the generator 3 is increased. The motor is therefore energized when the speed of the vessel is low, so that the indicating mechanism responds accordingly. If the direction of rotation of the propeller shaft be reversed the generator armature simply turns in the direction contrary to that above contemplated, and the currents produced by action of the generator are now produced in reverse order of phase relation. The armatures of the motor now turn as before, with the exception that the direction of rotation is reversed. The tachometers therefore indicate a reverse direction of rotation of the propeller shaft, as well as its number of revolutions per minute.

I do not limit myself to the particular construction shown, as variations may be made therein, without departing from the spirit of my invention, the scope of which is commensurate with my claims.

What I claim is,—

1. The combination, with a revoluble shaft and an instrument for indicating motions of said revoluble shaft, of a generator driven by aid of said shaft and provided with a field and an armature, means controllable by currents generated in said armature for varying the power of said field, an electric motor connected with said instrument for actuating the same, and electrical connections from said motor to the armature of said generator.

2. The combination with a revoluble shaft and an instrument for indicating motions of the same, of a generator provided with a field and with an armature, a resistance normally in series with said field, a circuit for energizing said field through said resistance, a motor connected with said instrument and provided with a revoluble armature, electrical conductors from said armature of said motor to said armature of said generator, and mechanism controllable by currents generated within said armature of said generator for short circuiting said resistance.

3. The combination, with a revoluble shaft and an instrument for indicating motions of said shaft, of a three-phase generator provided with a stationary field and with a revoluble armature, a resistance normally in series with said field for the purpose of weakening currents used for energizing said field, an electric motor provided with a revoluble armature, electrical connections from said revoluble armature of said generator to said revoluble armature of said field, a solenoid connected to some of said electrical connections and normally energized thereby, contact mechanism controllable by said solenoid, and connections from said contact mechanism to opposite portions of said resistance for the purpose of enabling said contact mechanism, under control of said solenoid, to short circuit said resistance.

In testimony whereof I have hereunto set my hand in presence of two subscribing witnesses.

JOHN J. CRAIN.

Witnesses:
  FREDERICK V. KOLB.
  L. T. CRAIN.